United States Patent
Ando (10) Patent No.: US 7,567,755 B2
(45) Date of Patent: Jul. 28, 2009

(54) INFORMATION RECORDING APPARATUS HAVING PLURALITY OF START MODES

(75) Inventor: Hirotake Ando, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 11/611,702

(22) Filed: Dec. 15, 2006

(65) Prior Publication Data
US 2007/0160366 A1    Jul. 12, 2007

(30) Foreign Application Priority Data
Jan. 6, 2006  (JP) .............................. 2006-001445

(51) Int. Cl.
G03B 17/48 (2006.01)
H04N 9/68 (2006.01)
(52) U.S. Cl. .................. 396/429; 348/231.7; 348/231.9
(58) Field of Classification Search .............. 348/231.7; 386/95; 396/429
See application file for complete search history.

(56) References Cited

U.S. PATENT DOCUMENTS

| | | | |
|---|---|---|---|
| 5,107,101 A | 4/1992 | Ando | 250/201.5 |
| 5,140,573 A | 8/1992 | Ando | 369/44.28 |
| 5,274,457 A * | 12/1993 | Kobayashi et al. | 348/231.9 |
| 5,347,503 A | 9/1994 | Koyama et al. | 369/44.32 |
| 5,404,346 A | 4/1995 | Koyama et al. | 369/44.32 |
| 5,517,475 A | 5/1996 | Koyama et al. | 369/44.32 |
| 5,532,990 A | 7/1996 | Koyama et al. | 369/44.32 |
| 5,699,330 A | 12/1997 | Ogino et al. | 369/32 |
| 5,787,060 A | 7/1998 | Ando | 369/44.42 |
| 5,825,729 A | 10/1998 | Ogasawara et al. | 369/44.27 |
| 6,049,516 A | 4/2000 | Ogasawara et al. | 369/54 |
| 6,115,799 A * | 9/2000 | Ogawa | 711/171 |
| 6,147,943 A | 11/2000 | Ogasawara et al. | 369/44.32 |
| 6,470,413 B1 * | 10/2002 | Ogawa | 711/103 |
| 6,594,207 B2 * | 7/2003 | Suzuki | 369/47.11 |
| 6,788,341 B2 * | 9/2004 | Tsunoda et al. | 348/231.1 |
| 7,116,620 B2 | 10/2006 | Minabe et al. | 369/53.27 |
| 2001/0004341 A1 * | 6/2001 | Suzuki et al. | 369/44.27 |
| 2001/0012064 A1 * | 8/2001 | Kubo | 348/231 |
| 2002/0012298 A1 * | 1/2002 | Suzuki | 369/47.3 |
| 2002/0150011 A1 * | 10/2002 | Tsukihashi et al. | 369/47.33 |
| 2002/0191951 A1 * | 12/2002 | Sodeyama et al. | 386/46 |

(Continued)

FOREIGN PATENT DOCUMENTS

JP    2001-210002    8/2001

(Continued)

*Primary Examiner*—Melissa J Koval
(74) *Attorney, Agent, or Firm*—Fitzpatrick, Cella, Harper & Scinto (57) ABSTRACT

Provided is an information recording apparatus having a mode SW for selecting a first mode of starting photographing after operations of a unit for detecting whether or not there is a disk and a unit for detecting remaining recording capacity of the disk when an instruction is given to start photographing through a photographing SW, or a second mode of starting photographing and operating a unit for detecting whether or not there is a disk and a unit for detecting the remaining recording capacity of the disk when the instruction is given to start the photographing through the photographing SW. The information recording apparatus is convenient in that stress given to a user in a case where the photographing cannot be performed immediately or data cannot be recorded even though photographing has started can be suppressed to a minimum.

2 Claims, 5 Drawing Sheets

U.S. PATENT DOCUMENTS

| | | | |
|---|---|---|---|
| 2003/0133021 A1* | 7/2003 | Hamamura et al. | 348/229.1 |
| 2003/0151992 A1* | 8/2003 | Fujimoto et al. | 369/47.14 |
| 2003/0227847 A1* | 12/2003 | Minabe et al. | 369/53.27 |
| 2004/0013056 A1 | 1/2004 | Ando | 369/44.29 |
| 2005/0180276 A1 | 8/2005 | Watanabe et al. | 369/44.29 |
| 2006/0291350 A1 | 12/2006 | Minabe et al. | 369/47.32 |
| 2007/0160366 A1 | 7/2007 | Ando | 369/429 |

FOREIGN PATENT DOCUMENTS

| | | |
|---|---|---|
| JP | 2003-317389 | 11/2003 |

* cited by examiner

INFORMATION RECORDING APPARATUS HAVING PLURALITY OF START MODES

BACKGROUND OF THE INVENTION

1. Field of the Invention

The present invention relates to an information recording apparatus for recording information such as images and sounds to a recording medium such as an optical disk, and more specifically, to a technique of shortening a time required for the information recording apparatus to become capable of photographing images since turning on of its power.

2. Description of the Related Art

Conventionally, an information recording apparatus for recording information such as images to a disk such as an optical disk has a problem in that it takes a long time to become capable of recording information to the disk since turning on power thereof. Specifically, a video camera for recording moving images has a problem in that an opportunity for photographing images is lost because it is unable to record images immediately after power is turned on, and the like.

As a method of solving this problem, there has been a method as proposed in Japanese Patent Application Laid-Open No. 2001-210002. The method proposed in Japanese Patent Application Laid-Open No. 2001-210002 is used to record information such as images in a recording means other than a disk, such as a memory first after its power is turned on, and then recording the information stored first in the memory or the like to the disk after it becomes possible to record to the disk.

The method proposed in Japanese Patent Application Laid-Open No. 2001-210002 has characteristics in that images can be photographed immediately after its power is turned on without losing a photographing opportunity even with a video camera and the like by storing data first in the recording means even when recording to the disk is unable to be performed immediately.

However, in this method, even though the information is recorded in the recording means such as the memory until when the disk is ready, it is unable to obtain information on remaining capacity of the disk at a point of time when the memory starts to store the information. Actually, information on a recordable remaining capacity of the disk is obtained after obtaining file information of a considerably later process in preparing the disk.

When it is found that there is no or small capacity left in the disk at this point of time, a problematic situation occurs in that a whole or part of data stored in the memory cannot be recorded to the disk. The situation as described above gives much stress to a user who thinks that the data is recorded to the disk concurrent with the start of photographing (user who does not known that the data is stored temporarily in the memory).

The stress is immeasurable when photographed data is taken at a critical moment and is not recorded in the disk.

When photographing becomes possible after confirming the remaining capacity of the disk to avoid the situation as described above, it becomes impossible to start photographing immediately after turning on of the power.

For example, even when the user tries to start photographing by mounting a new disk to the information recording apparatus, photographing is not permitted until the remaining capacity of the disk is confirmed by reading information thereof even though the remaining capacity of the new disk is sufficient for storing data.

Thus, Japanese Patent Application Laid-Open No. 2003-317389, for example, proposes a method of solving the problem as described above. The method proposed in Japanese Patent Application Laid-Open No. 2003-317389 uses means for monitoring insertion/removal of a recording medium and allows photographing to be started before the disk becomes recordable only when no insertion/removal is made during a period from when its power is turned off to when the power is turned on again.

In the method disclosed in Japanese Patent Application Laid-Open No. 2003-317389, when the user turns the power on and starts photographing in a state where the disk is kept mounted to the information recording apparatus, the user is allowed to perform photographing without stress because information such as remaining capacity of the disk is held inside. However, the same problem occurs when the disk is replaced.

SUMMARY OF THE INVENTION

According to an aspect of the present invention, there is provided an information recording apparatus for recording data of photographed images, including: a buffer memory for temporarily storing the photographed image data; a recording unit for recording the image data accumulated in the buffer memory to a disk recording medium; a disk recording medium detecting circuit for detecting whether or not the disk recording medium is mounted; a remaining recording capacity detecting circuit for detecting remaining capacity of the disk recording medium; and a selection circuit for selecting one from the group consisting of: a first mode of starting to accumulate the image data to the buffer memory after operations of the disk recording medium detecting circuit and the remaining capacity detecting circuit; and a second mode of starting operations of the disk recording medium detecting circuit and the remaining capacity detecting circuit after starting the accumulation of the image data to the buffer memory.

Further features of the present invention will become apparent from the following description of exemplary embodiments with reference to the attached drawings.

DESCRIPTION OF THE EMBODIMENTS

Next, preferred embodiments of the present invention will be explained in detail below with reference to the drawings.

First Embodiment

Figure 1:
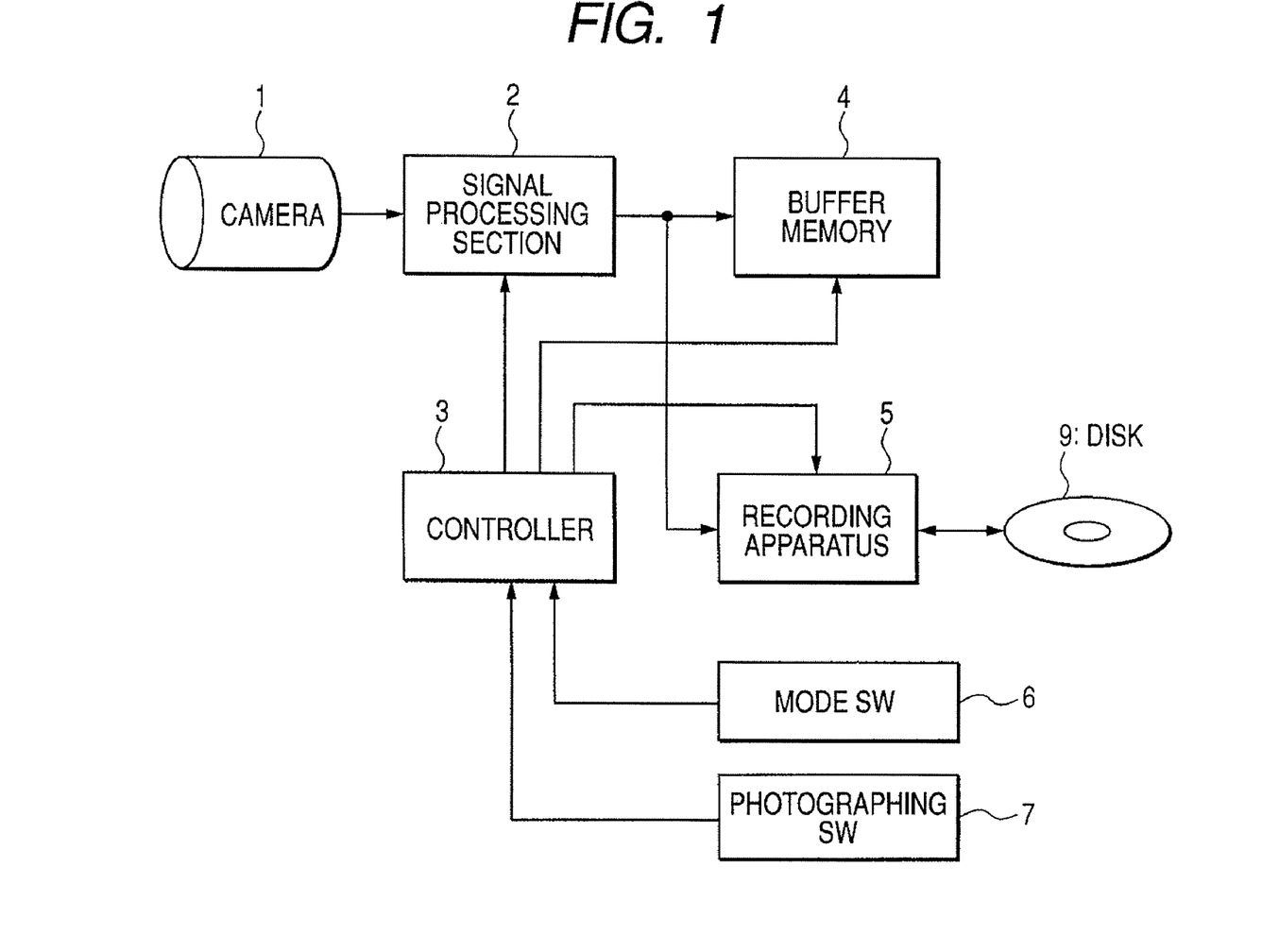
FIG. 1 is a block diagram showing a configuration of an information recording apparatus of a first embodiment of the present invention.

FIG. 1 is a block diagram showing a configuration of an information recording apparatus of a first embodiment the present invention. In the present embodiment, a video camera for recording images will be exemplified as the information recording apparatus. In FIG. 1, reference numeral 1 denotes a camera for photographing a subject; 2, a signal processing section for processing image signals from the camera 1; 3, a controller for controlling each section of the information recording apparatus; 4, a buffer memory for temporarily storing image data; and 5, a recording device for recording data to a disk 9 such as an optical disk. The disk 9 is replaceable with respect to the information recording apparatus.

Also, in FIG. 1, reference to numeral 6 denotes a mode switch (referred to as SW hereinafter) and 7, a photographing SW. The signal processing section 2 converts the image signals outputted from the camera 1 into compressed data such as MPEG 2. The converted data is outputted to the buffer memory 4 and the recording device 5 under the control of the controller 3.

The mode SW 6 is a switch for switching over two states of "Quick Start" and "Normal Start". The photographing SW 7 is a switch for switching over two states of "Photograph" and "Stop". The photographing SW 7 is connected to an interrupt input terminal of the controller 3 so as to be able to constantly detect that the mode of the photographing SW 7 is in "Photograph" by interruption.

Figure 2:
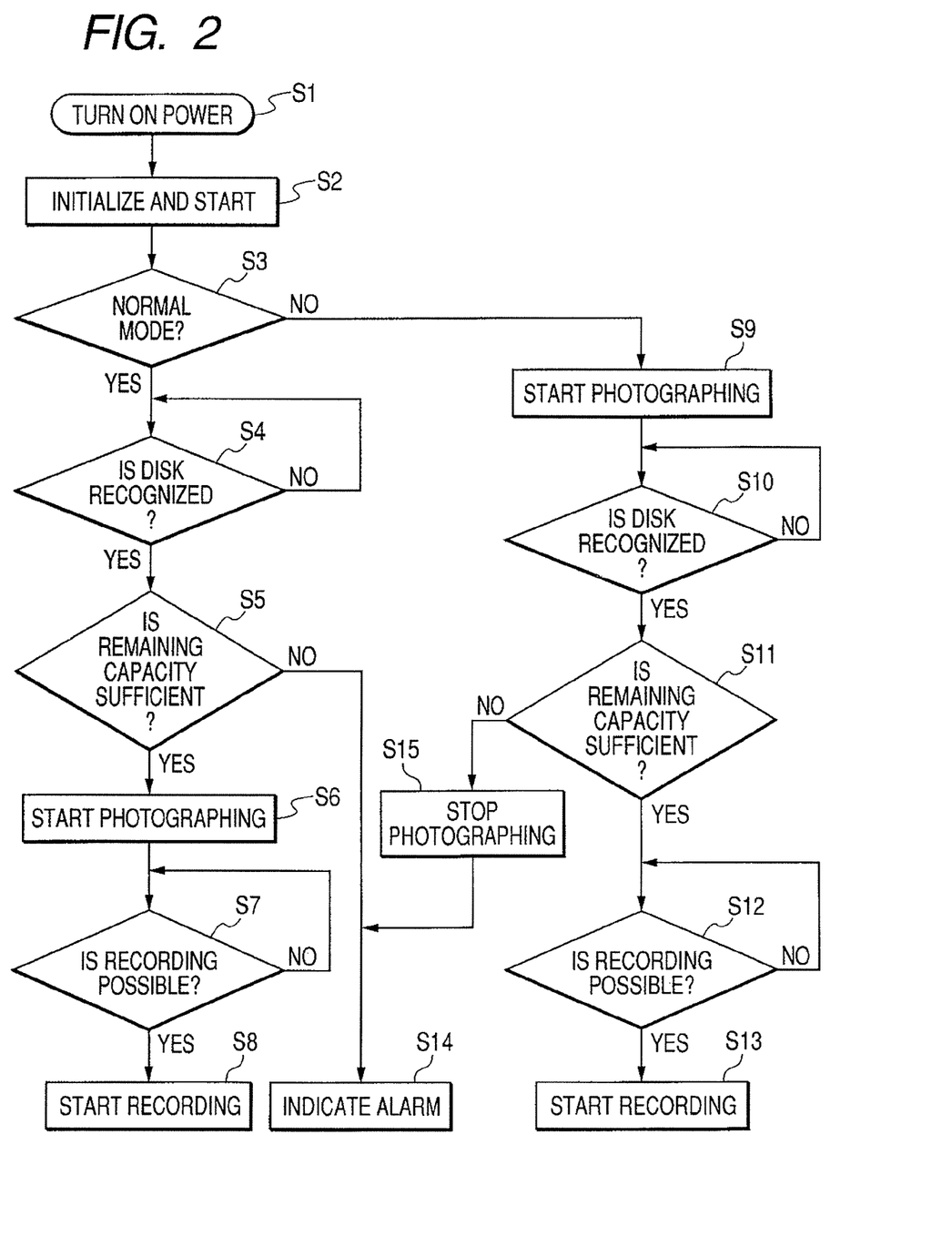
FIG. 2 is a flowchart for explaining operations of the information recording apparatus shown in FIG. 1.

Next, an operation of the present embodiment will be explained with reference to a flowchart in FIG. 2. First, when a power is turn on by a switch or the like (not shown) in Step S1, the controller 3 initializes each section in Step S2. While the camera 1, the signal processing section 2, and the buffer memory 4 become operable immediately by the initialization, the recording device 5 starts an operation for recognizing the disk 9. In other words, the recording device 5 detects whether or not the disk 9 is mounted in the information recording apparatus.

Subsequently, the controller 3 checks the mode SW 6 in Step S3. When the mode of the mode SW 6 is "Normal Start", the controller 3 checks the state of the recording device 5 and confirms whether or not the recognition of the disk 9 has been finished in Step S4. The recording device 5 detects whether or not there exists the disk 9 by using a switch or the like for detecting the disk 9.

When the controller 3 finds that the disk 9 is mounted, the controller 3 checks the remaining recording capacity of the disk 9 in Step S5. When the controller 3 confirms that there is still capacity left and when the mode of the photographing SW 7 has been "Photograph" up to this point of time, the controller 3 starts to accumulate data obtained by compressing an output of the camera 1 by the signal processing section 2 to the buffer memory 4 in Step S6.

The controller 3 also checks the state of the recording device 5 to confirm whether or not it has become possible to record to the disk 9 in Step S7. When it becomes possible for the recording device 5 to record to the disk 9, the controller 3 sends the data accumulated in the buffer memory 4 to the recording device 5 to start recording to the disk 9 within the information recording apparatus in Step S8.

Next, an operation of the information recording apparatus when the mode of the mode SW 6 is "Quick Start" will be explained. The operation up until the initialization operation (S2) of each section by the controller 3 after the power is turned on in Step S1 is carried out in the same manner as described above. Subsequently, the controller 3 checks the mode SW 6 in Step S3. At this time, the mode of the mode SW 6 is assumed to be in "Quick Start".

When the mode of the photographing SW 7 has been "Photograph" up to this point of time, the controller 3 starts to accumulate data obtained by compressing the output of the camera 1 by the signal processing section 2 to the buffer memory 4 in Step S9. The controller 3 checks the state of the recording device 5 while accumulating the data and confirms whether or not the recognition of the disk 9 has been finished in Step S10.

When the controller 3 finds that the disk 9 is mounted, the controller 3 checks the remaining capacity of the disk 9 in the same manner in Step S11. When the controller 3 confirms that there is still capacity left, the controller 3 checks the state of the recording device 5 to confirm whether or not it has become possible to record to the disk 9 in Step S12.

When it becomes possible for the recording device 5 to record to the disk 9, the controller 3 sends the data accumulated in the buffer memory 4 to the recording device 5 to start recording to the disk 9 within the information recording apparatus in Step S13.

It should be noted that when the mode of the mode SW 6 is "Normal Start" and when there is no capacity left in the disk 9 in Step S5, the controller 3 displays a warning to that effect in Step S14. Further, when the mode of the mode SW 6 is "Quick Start" and when the controller 3 confirms that there is no capacity left in the disk 9 in Step S11, the controller 3 stops the accumulation of the data to the buffer memory 4 (stops photographing) in Step S15 and displays a warning indicating that there is no capacity left in the disk in Step S14.

When the mode of the mode SW 6 is "Normal Start", the user can start photographing after the mode of the photographing SW 7 is switched to "Photograph", the disk 9 is recognized to exist, and it is confirmed that there is capacity left in the disk 9 as described above. When the mode of the mode SW 6 is "Quick Start", the user can start photographing without having to recognize the disk 9 as soon as the mode of the photographing SW 7 is switched to "Photograph".

Because it takes several seconds to recognize the disk in general, the actual time required for starting photographing of images after turning on of the power is delayed for several seconds in the "Normal Start" mode as compared to the "Quick Start" mode. Then, when the user photographs images under recognition that there is capacity left in the disk within the video camera, for example, the user can photograph images without any stress while shortening the time required for starting photographing when the user performs photographing in a state where the mode of the mode SW 6 is "Quick Start".

On the contrary, when the user is not sure whether there is capacity left in the disk within the video camera, a situation in which photographed images are not recorded to the disk does not occur when photographing is started by setting the mode of the mode SW 6 to "Normal Start".

While the video camera has been exemplified in the present embodiment, the present invention is also applicable to a sound recording apparatus using a microphone as an input device. In this case, the photographing SW 7 is assumed as a recording SW7 and each of the modes is assumed as "Record" and "Stop" modes, respectively. The same also applies to the following embodiments.

Second Embodiment

Figure 3:
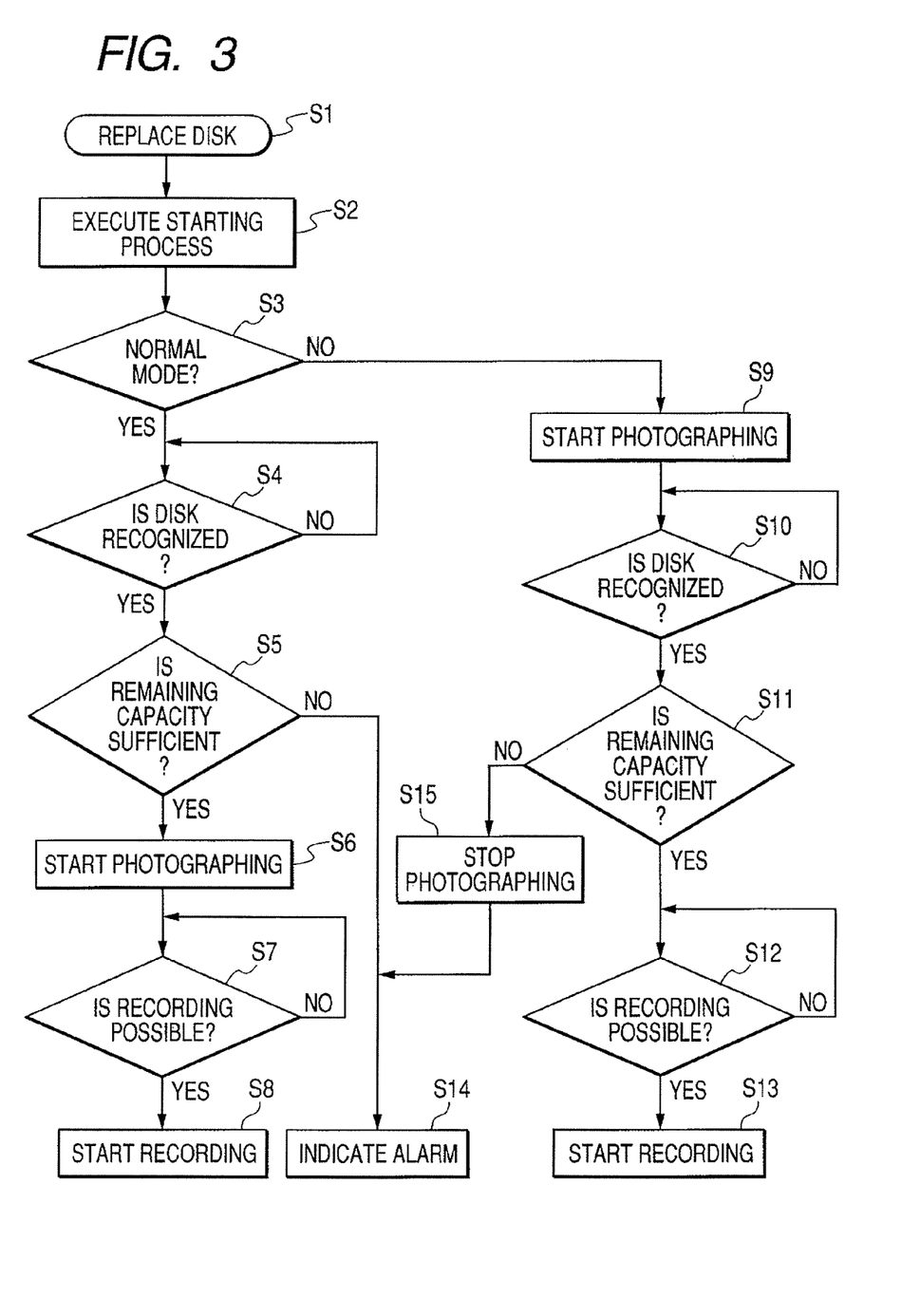
FIG. 3 is a flowchart for explaining operations of the information recording apparatus of a second embodiment of the present invention.

FIG. 3 is a flowchart for explaining operations of the information recording apparatus of a second embodiment of the present invention. A configuration of the information recording apparatus is same as that shown in FIG. 1, so explanation thereof will be omitted. The second embodiment will be explained with reference to the flowchart in FIG. 3.

When the disk 9 is replaced in a state where the power is on in Step S1, the controller 3 carries out the process for starting the recording device 5 in Step S2. Although the initialization of the camera 1, the signal processing section 2, the buffer memory 4, and the like has been finished because the power is on, the recording device 5 starts the operation for recognizing the disk 9 by a starting process because the disk 9 has just been mounted.

Next, the controller 3 checks the mode SW 6 in Step S3. When the mode of the mode SW 6 is "Normal Start" at this time, the controller 3 checks the state of the recording device 5 to confirm whether or not the recording device 5 has finished the recognition of the disk 9 in Step S4.

When the controller 3 finds that the recognition of the disk 9 has been finished, the controller 3 checks the remaining capacity of the disk 9 in Step S5. When it is confirmed that there is capacity left in the disk and when the mode of the photographing SW 7 has been "Photograph" up to this point of time, the controller 3 starts to accumulate data obtained by compressing an output of the camera 1 by the signal processing section 2 to the buffer memory 4 in Step S6.

The controller 3 also checks the state of the recording device 5 to confirm whether or not the recording device 5 is capable of recording to the disk 9 in Step S7. When the recording device 5 is capable of recording to the disk 9, the controller 3 sends the data accumulated in the buffer memory 4 to the recording device 5 to start recording to the disk 9 within the information recording apparatus in Step S8.

Next, operations of the information recording apparatus when the mode of the mode SW 6 is "Quick Start" will be explained. The operations are the same up to Steps S1 and S2 in which the disk is replaced in the state where the power is on and the process for starting the recording device 5 by the controller 3 is carried out.

Subsequently, the controller 3 checks the mode SW 6 in Step S3. When the mode of the mode SW 6 is "Quick Start" at this point of time and the mode of the photographing SW 7 has been "Photograph" up until then, the controller 3 starts to accumulate data obtained by compressing an output of the camera 1 by the signal processing section 2 to the buffer memory 4 in Step S9.

The controller 3 checks the state of the recording device 5 while accumulating the data and confirms whether or not the recognition of the disk 9 has been finished in Step S10. When the controller 3 finds that the recognition of the disk 9 has been finished, the controller 3 checks the remaining capacity of the disk 9 in Step S11.

When the controller 3 confirms that there is still capacity left in the disk 9, the controller 3 checks the state of the recording device 5 to confirm whether or not the recording device 5 is capable of recording data to the disk 9 in Step S12. When the recording device 5 is capable of recording data to the disk 9, the controller 3 sends the data accumulated in the buffer memory 4 to the recording device 5 to start recording to the disk 9 in the information recording apparatus in Step S13.

It should be noted that when the mode of the mode SW 6 is "Normal Start" and when the controller 3 confirms that there is no capacity left in the disk 9, the controller 3 displays a warning indicating that is no capacity left in the disk 9 in Step S14. Further, when the mode of the mode SW 6 is "Quick Start" and when the controller 3 confirms that there is no capacity left in the disk 9 in Step S11, the controller 3 stops the accumulation of the data to the buffer memory 4 (stops photographing) in Step S15 and displays a warning indicating that there is no capacity left in the disk in Step S14.

When the mode of the mode SW 6 is "Normal Start", the user can start photographing after the mode of the photographing SW 7 is switched to "Photograph", the disk 9 is recognized to exist, and it is confirmed that there is capacity left in the disk 9 as described above. When the mode of the mode SW 6 is "Quick Start", the user can start photographing without having to recognize the disk 9 as soon as the mode of the photographing SW 7 is switched to "Photograph".

Because it takes several seconds to recognize the disk in general, the actual time required for starting photographing of images after replacing the disk is delayed several seconds in the "Normal Start" mode as compared to the "Quick Start" mode. When the user photographs images by mounting a new formatted disk or a disk whose capacity is still left, the user can photograph without any stress while shortening the time for starting photographing when the user performs photographing in a state where the mode of the mode SW 6 is "Quick Start".

When a disk, in which it is not sure whether or not there is capacity left, is used, a situation in which photographed images cannot be recorded to the disk will not occur by starting photographing in a state where the mode of the mode SW 6 is "Normal Start".

Third Embodiment

Figure 4:
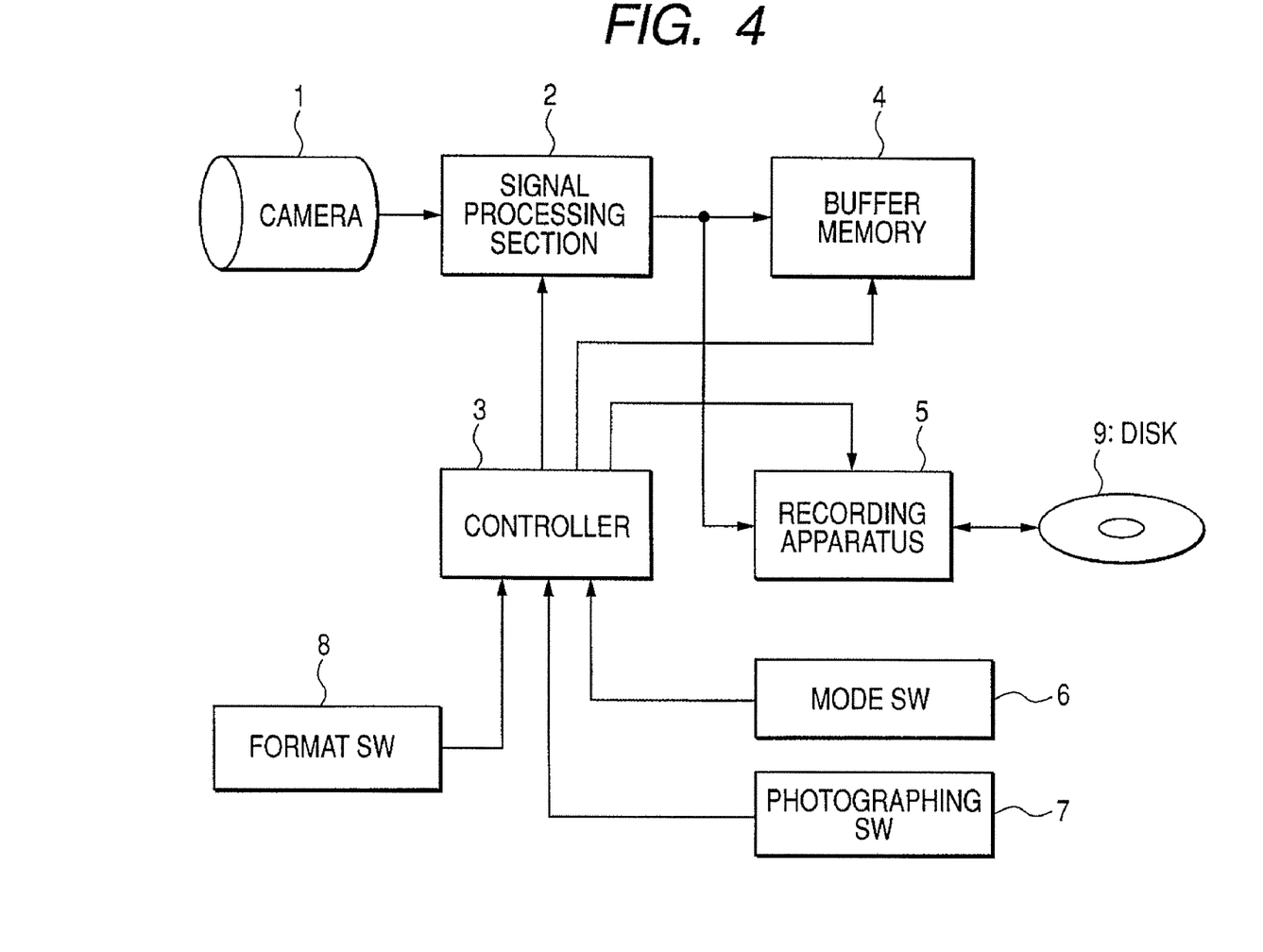
FIG. 4 is a block diagram showing an information recording apparatus of a third embodiment of the present invention.
Figure 5:
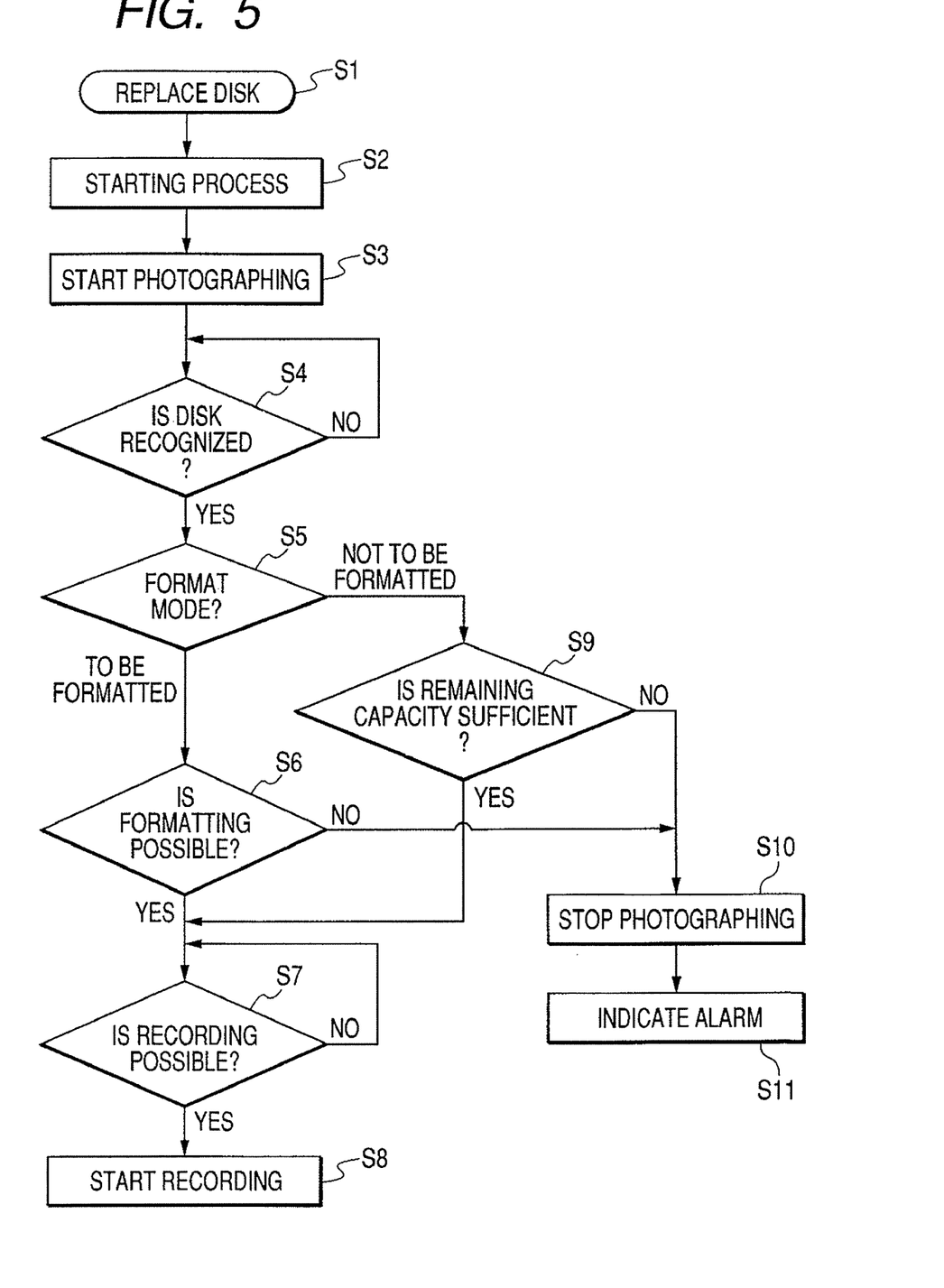
FIG. 5 is a flowchart for explaining operations of the information recording apparatus shown in FIG. 4.

Next, a third embodiment of the present invention will be explained. FIG. 4 is a block diagram showing an information recording apparatus of the third embodiment and FIG. 5 is a flowchart showing its operations. Although the configuration of this embodiment in the block diagram is substantially the same as that shown in FIG. 1, it is different in that a format SW 8 is added thereto. The other configuration is the same as that shown in FIG. 1.

The format SW 8 is a switch for switching over two states of "Format" and "Non-format" of the disk.

Next, operations of the information recording apparatus of the third embodiment will be explained below with reference to the flowchart in FIG. 5. Because the operations of this embodiment when the mode of the mode SW 6 is "Normal Start" is the same as that of the second embodiment, the flowchart in FIG. 5 shows only the case where the mode of the mode SW 6 is "Quick Start".

When the disk 9 is replaced in the state where the power is on in Step S1, the controller 3 carries out the process for starting the recording device 5 in Step S2. Although the initialization of the camera 1, the signal processing section 2, the buffer memory 4, and the like has been finished because the power is turned on, the recording device 5 starts the operation for recognizing the disk 9 by its starting process because the disk 9 has just been mounted.

Subsequently, the controller 3 checks the mode SW 6. The mode of the mode SW 6 is assumed to be "Quick Start" in the present embodiment. When the mode of the photographing SW 7 has been "Photograph" up to this point of time, the controller 3 starts to accumulate data obtained by compressing an output of the camera 1 by the signal processing section 2 to the buffer memory 4 in Step S3.

The controller 3 checks the state of the recording device 5 while continuing the accumulation and confirms whether or not the recognition of the disk 9 has been finished in Step S4. Next, the controller 3 checks the state of the format SW 8 in Step S5. When the mode of the format SW 8 is "Format" at this time, the controller 3 confirms whether or not formatting is possible for the disk in Step S6. When the disk is capable of being formatted, the controller 3 formats the disk by controlling the recording device 5 in Step S6.

When the controller 3 finds that formatting is not possible for the disk in Step S6, the controller 3 displays a warning in Step S11 after stopping the recording to the buffer memory 4 in Step S10. Examples of the disk incapable of being formatted include a disk that can be recorded only once or a protected disk.

When the process in Step S6 ends, the controller 3 checks the state of the recording device 5 and confirms whether or not the formatting has been finished and the disk has become recordable in Step S7. When the disk becomes recordable, the controller 3 sends the data accumulated in the buffer memory 4 to the recording device 5 to start recording to the disk in the information recording apparatus in Step S8.

On the other hand, when the controller 3 checks the state of the format SW 8 and when its mode is "Non-format" in Step S5, the controller 3 checks the remaining capacity of the disk in Step S9. When the controller 3 confirms that there is still capacity left in the disk, the controller 3 checks the state of the recording device 5 to confirm whether or not the recording device 5 is capable of recording to the disk in Step S7.

When the recording device 5 becomes capable of recording to the disk, the controller 3 sends the data accumulated in the buffer memory 4 to the recording device 5 to start recording to the disk in the information recording apparatus in Step S8. It should be noted that when the controller 3 confirms that is no capacity left in the disk in the information recording apparatus in Step S9, the controller 3 displays a warning indicating that there is no left in the disk in Step S11 after stopping the accumulation (stopping photographing) to the buffer memory 4 in Step S10.

When the mode of the mode SW 6 is "Quick Start", the user can format the disk while continuing photographing and can start recording to the disk after the formatting by keeping the mode of the format SW 8 as "Format" as described above. Therefore, the user can start photographing immediately without feeling any stress even when the user replaces the disk with an erasable disk or inserts a new unformatted disk.

Further, the user can photograph images without having to care for the capacity left in a disk when the disk that can be repeatedly used is used because the formatting operation of the disk is carried out.

Because it takes several to several tens of seconds to format a disk in general, the user can photograph images without waiting for the time required for the user to actually start photographing images after replacing the disk in the mode of "Format".

Further, a situation in which important images in the disk are lost due to formatting does not occur when a disk not sure of whether it may be formatted or not is used by starting photographing in a state where the mode of the format SW 8 is "Non-format".

The information recording apparatus of the present invention has a first mode of carrying out control so as to start the accumulation of information to the buffer memory before obtaining information on remaining capacity of the disk and to start recording from the buffer memory to the disk after obtaining the information on the remaining capacity after the user instructs recording in recording information such as images or sounds to the disk. There is also provided a second mode of carrying out control so as to start the accumulation of information to the buffer memory after obtaining the information on the remaining capacity of the disk and then to start recording from the buffer memory to the disk after the user instructs the recording. By enabling the user to select the first or second mode, it is possible to provide the information recording apparatus capable of suppressing the stress that is given to the user to the minimum.

For example, a situation in which the user is unable to start photographing immediately in the case of using the video camera is not generated by selecting the first mode, for example. Further, a situation in which there is no left in the disk after starting photographing is also not generated by selecting the second mode.

Further, the user can select either the first or the second mode when the power is on, so when the user is aware that there is capacity left in the disk in the video camera and photographs images, the user can shorten the time required for starting photographing by selecting the first mode.

On the contrary, when the user is not sure whether there is capacity left in the disk in the video camera, a situation in which the photographed images cannot be recorded in the disk does not occur by selecting the second mode.

Furthermore, because the user can select the first or second mode in replacing the disk, the user can shorten the time required for starting photographing by selecting the first mode when the user starts photographing by mounting a new formatted disk to the information recording apparatus, for example.

Further, when the user starts photographing by mounting a disk in which it is not sure whether there is capacity left, a situation in which photographed images cannot be recorded to the disk does not occur by selecting the second mode.

Furthermore, the user is allowed to select a third mode of carrying out control so as to format a disk concurrent with starting of the recording and then to start recording from the buffer memory to the disk. Therefore, when the user starts photographing by mounting a new unformatted disk or a disk that can be erased to the information recording apparatus, for example, the user can shorten the time required for starting photographing by selecting the third mode.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-001445, filed Jan. 6, 2006, which is hereby incorporated by reference herein in its entirety.

What is claimed is:

1. An information recording apparatus for recording photographed image data, comprising:

a buffer memory for temporarily storing the photographed image data;

a recording unit for recording the image data accumulated in the buffer memory to a disk recording medium;

a disk recording medium detecting circuit for detecting whether or not the disk recording medium is mounted;

a remaining recording capacity detecting circuit for detecting remaining capacity of the disk recording medium; and a selection circuit for selecting one mode from the group of modes consisting of the following when the disk recording medium is changed:

a first mode of starting to accumulate the image data in the buffer memory after operation of both the disk recording medium detecting circuit and the remaining capacity detecting circuit; and a second mode of starting operation of both the disk recording medium detecting circuit and the remaining capacity detecting circuit, after starting the accumulation of the image data in the buffer memory.

2. The information recording apparatus according to claim 1, further comprising a circuit for instructing formatting of the disk recording medium, wherein the information recording apparatus starts formatting of the disk recording medium after starting the accumulation of the image data to the buffer memory when the second mode is selected by the selection circuit and the formatting of the disk recording medium is instructed by the instruction circuit.

* * * * *